E. T. WOLF.
REMOVABLE MOLD FOR MAKING PIANO HAMMERS.
APPLICATION FILED JAN. 27, 1905.
969,826.
Patented Sept. 13, 1910.
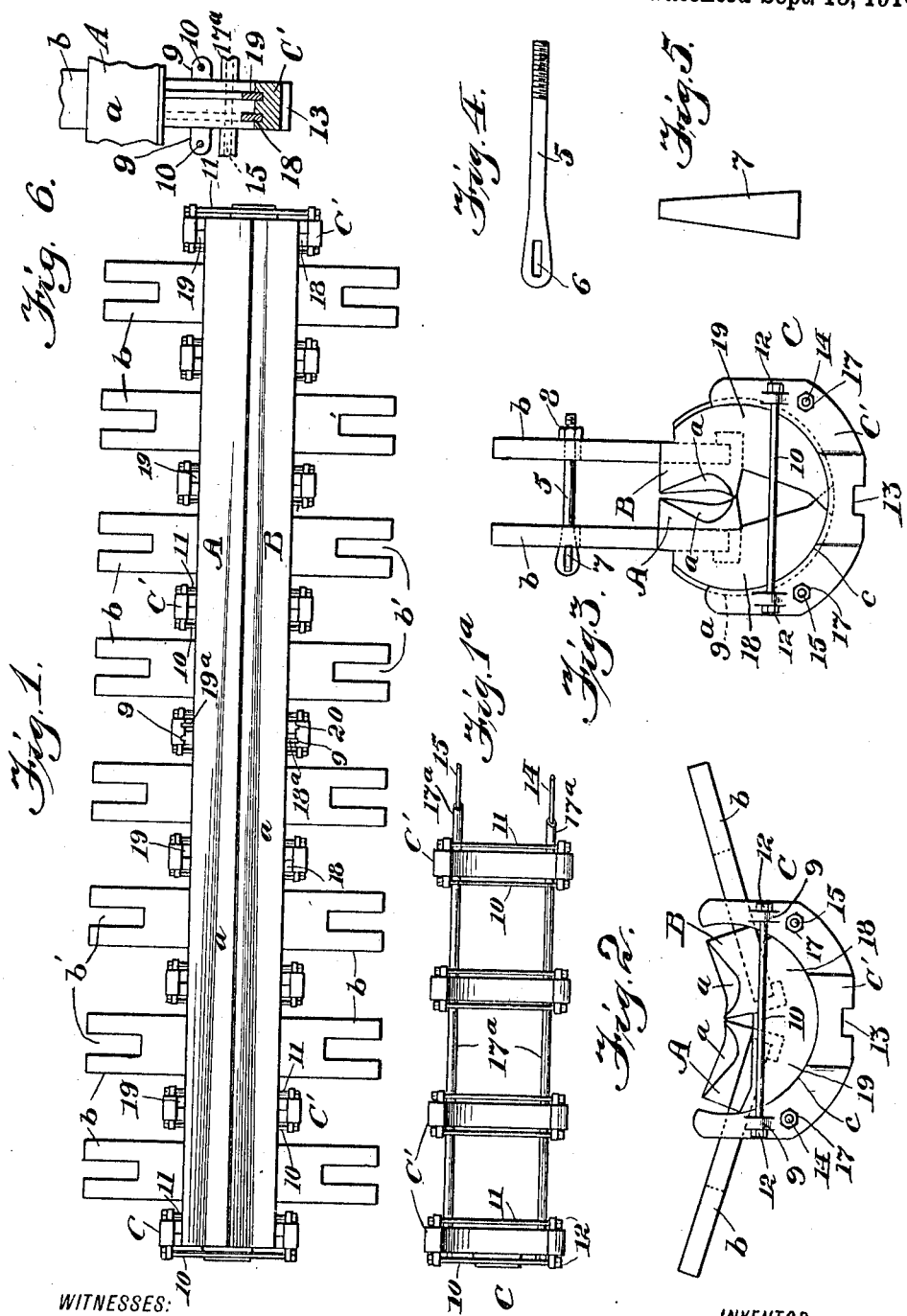

UNITED STATES PATENT OFFICE.

EDMUND T. WOLF, OF NEW YORK, N. Y., ASSIGNOR TO FRANK L. ZABRISKIE, OF NEW YORK, N. Y.

REMOVABLE MOLD FOR MAKING PIANO-HAMMERS.

969,826. Specification of Letters Patent. Patented Sept. 13, 1910.

Application filed January 27, 1905. Serial No. 242,954.

*To all whom it may concern:*

Be it known that I, EDMUND T. WOLF, a citizen of the United States, residing in the city of New York, borough of the Bronx, and county and State of New York, have invented certain new and useful Improvements in Removable Molds for Making Piano-Hammers, of which the following is a specification.

My invention relates to a removable mold for making piano hammers, the same being designed for use in connection with a suitable type of power machine or press, one kind of such machine being disclosed by prior Letters Patent of the United States issued to me on July 5, 1904, No. 764,025. It is to be understood, however, that my removable mold is not restricted in its use to the machine of my prior patent, but that I reserve the right to employ it in connection with any appropriate power mechanism, or in any way that may hereafter be found suitable.

In the present invention I provide a removable mold especially designed to withstand the pressure of the machine in the operation of compressing one or more layers of felt around a molding of a set of piano hammers.

In this art it is customary to make at one operation a complete set of piano hammers in a hand press having a mold forming a permanent part of or a fixture in the press. As the hammers of a set vary in size, it is necessary to employ long molds, the same being usually constructed in continuous sections adapted to be opened and closed, each continuous mold section or "caul" having a working face which varies in shape longitudinally and crosswise of the section in order to conform to the different sizes of hammers in the set. Owing to the length of the mold sections, and the high pressure to which they are subjected in order to compress one or more layers of felt around the molding for a set of hammers, it is difficult in a removable mold to prevent the individual mold sections from bending. Practical experience has shown that the mold sections of a removable mold become bent or mis-shapen after a comparatively short period of service, thus entailing the expense of new molds.

I seek to provide a new construction of a removable hammer mold whereby the mold sections are so reinforced as to prevent them from bending under the pressure of the power machine, thus increasing the durability and life of such removable molds and securing economy in the manufacture of piano hammers.

Another purpose of the invention is to provide a new construction of removable molds wherein mold-sections may be used interchangeably in connection with a common base or carriage, the latter forming a permanent part of the removable mold. This permits cauls or sections for the manufacture of hammers using different weights of felt. It should be explained that the felt used in the manufacture of piano hammers varies in weight from eight pounds to sixteen pounds per set of hammers; and this of course requires different mold sections or cauls for the proper compression of such felts around the moldings. My new construction of the removable mold enables different sets of cauls or mold sections to be used interchangeably in a common base or carriage.

Broadly speaking, my invention consists of a removable hammer-making mold comprising a base or carriage, and mold sections or cauls fitted to said base or carriage. Preferably, each caul has a number of bearing points of engagement with said base, the points of engagement for each section or caul being distributed at suitable intervals throughout the length of such caul, whereby said sections or cauls are reinforced against bending and they are adapted to be opened or closed by moving in transverse directions upon the base.

Preferably, the sections or cauls of the mold are not hinged or pivoted to each other, nor are they pivoted to the base or carriage. Each caul or section is provided at intervals with flanges or webs having curved or arcuate edges which have firm bearing upon the arcuate faces of saddles, the latter forming the base or carriage, and the adjacent webs of the complemental sections or cauls are disposed in lapping order within the respective saddles. This construction keeps the cauls in proper positions on the base or carriage, and permits them to be opened or closed, the webs turning or riding on the saddles, upon the arcuate faces thereof.

Further objects and advantages will appear in the course of the subjoined description, and the actual scope of the invention will be defined by the annexed claims.

In the drawings, wherein like characters of reference are used to indicate corresponding parts in all the figures:—Figure 1 is a plan view of my removable mold showing the sections or cauls in their opened positions. Fig. 1$^a$ is a plan view of a portion of the mold base or carriage, the cauls or sections being omitted. Figs. 2 and 3 are views in elevation looking at the respective ends of the mold to show the difference in the size of the mold cavity at the ends of said mold; the cauls or sections being shown in their opened and closed positions by Figs. 2 and 3 respectively. Figs. 4 and 5 are detail views of the parts of a fastening device, a series of which are to be used for securing the cauls in place after the mold is closed for compressing the felt and molding. Fig. 6 is a section taken through one of the saddles in the direction of the length of the mold, showing the tie rods for bracing one of the saddles, and two webs of the cauls fitting in the grooves of the saddle, said tie rods passing below the continuous parts of the cauls and being positioned alongside the webs which extend from the cauls so as to be seated upon the saddle.

My removable mold consists of the sections or cauls A, B, and a base or carriage which is indicated in its entirety by the letter C. Each section or caul, A or B, is made in a single piece of metal, usually by casting it, although it may be made in any other appropriate way. Said section or caul extends the full length of the mold, and it has a working surface, $a$, which is of peculiar contour because it conforms in cross section to the shapes of the different sizes of hammers in a complete set. Furthermore, each caul is provided with a series of outwardly-extending arms $b$, each having a slot $b'$; and the arms $b$ of the complemental cauls are correspondingly arranged in order that they will be grouped in pairs when said cauls are closed to the positions shown by Fig. 3, thereby permitting the fastening devices to be adjusted readily in the slotted ends of the arms $b$. Any suitable means may be used for holding the cauls securely locked in their closed positions, but as shown I provide the slotted arms and the fastening devices, each of the latter consisting of a bolt 5, threaded at one end and having a key slot 6 near the other end, and a wedge or key 7, see Figs. 3, 4 and 5. While the mold is under pressure, with the cauls in their closed positions, a bolt 5 may be placed easily in the arms $b$ of each pair on the respective cauls, after which the nut 8 and the key 7 may be tightened, whereby the series of fasteners hold the two series of arms $b$ and the cauls A B in their closed positions.

The base or carriage C is constructed in a peculiar way to afford a number of bearing points for the cauls A, B, and to guide or direct said cauls when they are opened or closed, thus confining the cauls in their proper positions. Said base consists of a plurality of sections C' spaced at proper intervals and united one to the other so as to form a strong and durable structure. Each carriage section C' is preferably in the shape of a saddle or yoke, and it is cast, or otherwise made, in a single piece. The upper face of each saddle or section C' is curved as shown at $c$, and one or more of the saddles are provided with a groove or channel 9$^a$, the curvature of each saddle being a little more than a half of a circle. Each saddle is provided with lugs or ears 9 on the respective sides thereof, said lugs being on the arms of the yoke, and through the lugs are passed the tie rods 10, 11, one on each side, said rods having the nuts and heads 12, whereby the rods serve as stays for the arms of the saddle and operate to prevent breakage thereof. Furthermore, each saddle is provided in its lower side, with a transverse groove 13, and the saddles are assembled for the grooves 13 to aline or register lengthwise of the carriage, thereby forming a longitudinal guideway adapted to receive a track or rail (not shown), whereby the mold is adapted to be held in place in a suitable machine, and to be moved endwise in inserting it into or withdrawing it from said machine, substantially as set forth in the operation of the mold disclosed by my prior patent From the foregoing it is to be understood that each saddle is provided with two tie rods 10, 11, one on each side, said rods being positioned externally to the curved bearing or channel. The cauls, A, B, are each composed, preferably, of a continuous plate, and as will presently appear, each caul has a plurality of webs which have their edges seated in the channels or bearings of the saddles. These webs 18, 19 are arranged in pairs, the edge portions of each pair fitting snugly together within the channel of one saddle, as shown clearly by full and dotted lines in Fig. 3 and in full lines in Fig. 2, said webs of one pair being between the two tie rods of each saddle, as shown in Fig. 1$^a$. All the tie rods lie below the cauls, A, B, when they are opened or closed, see Figs. 2 and 3, although said rods extend across the lines of the webs 18, 19, but in any case, the tie rods do not interfere in any manner whatsoever with the operations of opening or closing the mold sections or jaws formed by the cauls and webs.

The several carriage sections or saddles C' are connected in spaced order by any suitable means. In the drawings, longitudinal bolts 14, 15, are passed through suitable openings in the saddles, and on these bolts are fitted the spacing sleeves or thimbles 17$^a$ which abut the saddles, suitable nuts 17 being screwed on the ends of the bolts, whereby the parts may be bound firmly together so as to hold the saddles C' in their proper spaced parallel order. It is evident, however, that the sections may be united by other forms of mechanical devices.

The mold sections or cauls A, B, are not hinged or pivoted together, nor are they pivoted to the base or carriage C. On the contrary, these sections or cauls are provided with means whereby they bear on the series of carriage saddles so as to be reinforced at numerous points throughout the length of the cauls, thus minimizing the bending thereof under the pressure exerted thereon by the machine. The sections or cauls A, B, are constructed with a plurality of webs or flanges 18, 19, respectively, a series of such webs being provided on each caul, and the number of webs in each series being equal to the number of carriage saddles C'. All the webs have curved lower edges, the radius of which is equal to that of the face $c$ on each carriage saddle, and these lower edges of the webs fit snugly to the faces $c$ of the saddles, in order that the cauls may have firm bearing at a number of points on the base and to enable the webs to turn freely within the base saddles when the cauls are open and closed. The webs 18 on the caul B are arranged in staggered or disalined order to the webs 19 on the caul A, and the two series of webs on the two cauls have such relation to each other that they overlap in pairs and bear on common saddles of the carriage. This arrangement holds the two cauls in proper relation to each other, and endwise displacement of the cauls in the carriage or base is overcome by providing the webs 18$^a$ 19$^a$ on the cauls with ribs 20, the latter fitting in the grooves or channels 9 of one of the carriage saddles C', see Fig. 1. It is evident that the webs 18, 19, will hold the cauls in the saddles of the carriage; that the cauls may be readily opened or closed; that the ribs 20 hold the cauls against sliding movement on the carriage; that the mold may be handled as an entirety, and that the cauls A, B, may be lifted out of the carriage or base easily and quickly, thus permitting other cauls to be used interchangeably on the base or carriage C.

In operation, the mold is placed in the machine by slipping it endwise therein, the guideway 13 of the mold-carriage fitting on the machine-track or rail, and the cauls A, B, being opened. One or more layers of hammer felt are now placed on the faces $a$ of the opened cauls, and the hammer molding is pressed on the felt, a suitable adhesive or glue having being applied to the felt or molding. The machine is operated to close the cauls and make them compress the felt around the molding, after which the fasteners 5, 7, are applied to the arms $b$ in order to lock the cauls A B in their closed positions. The pressure exerted by the machine is relaxed; and the mold, in a locked condition and containing the work, is now withdrawn or removed from the machine, the mold afterward being set aside a sufficient length of time for the adhesive to harden. It is evident that the fasteners 5, 7, are thereafter removed and the cauls are opened, to permit removal of the work from the mold.

From the foregoing description taken in connection with the drawings it will be understood that my mold is separate from or independent of the machine or press in which the mold is to be used, said mold being removable with the work from the press and being set aside in order that the work in the mold may set or harden. This enables a number of molds to be used in one machine or press, and the latter may remain in operation indefinitely and without regard to the molds which may have been used therein and withdrawn therefrom.

Changes in the form, size, proportion and minor details of construction may be made without departing from the spirit of the invention or sacrificing any of the advantages thereof, and I, therefore, reserve the right to make such alterations and modifications.

Having thus described my invention, what I claim and desire to secure by Letters Patent is:—

1. A removable hammer mold comprising a base or carriage, and cauls disconnected from each other and movable in arcuate paths on said base or carriage, said cauls when closed into parallel order producing a mold cavity.

2. A removable hammer mold comprising a base or carriage, and non-hinged cauls slidable in arcuate paths on said base or carriage, said cauls being free from hinged connection with each other and with said carriage.

3. A removable hammer mold comprising a carriage having a plurality of curved bearing surfaces and disconnected cauls each having a plurality of curved bearing faces which engage said bearing surfaces of the carriage, whereby the cauls are mounted to slide in arcuate paths on the carriage.

4. A removable hammer mold comprising a carriage, and complemental disconnected cauls supported thereby, each caul having throughout its length a plurality of arcuate bearings adapted to turn within similar arcuate bearing surfaces on said carriage.

5. A removable hammer mold comprising a base or carriage, and non-hinged cauls supported thereby, each caul having a plurality of arcuate webs which rest individually upon the base and are adapted to ride in an arcuate path thereon.

6. A removable hammer mold comprising a base or carriage provided with a segmental upper face, and non-hinged cauls each provided with webs constructed to rest upon, and turn within said segmental face, of the carriage, whereby said cauls may be lifted at will out of said carriage.

7. A removable mold comprising a carriage, and non-hinged cauls supported thereon, said carriage and the cauls having arcuate engaging faces whereby the cauls are reinforced by, and are adapted to turn with a sliding motion within, said carriage.

8. A removable hammer mold comprising a base having a segmental upper face, and non-hinged swinging cauls each provided with a plurality of arcuate webs arranged to bear upon said face of the base, said cauls being confined from endwise movement on the base.

9. A removable hammer mold comprising a base, and non-hinged cauls each provided with a plurality of webs resting on the base, the webs of one caul lapping those of the other caul.

10. A removable hammer mold comprising a base, and disconnected cauls each provided with a plurality of webs resting on the base and adapted to turn in an arcuate path thereon, the adjacent webs on the cauls lapping each other.

11. A removable hammer mold comprising a base having an arcuate grooved face, and non-hinged cauls each provided with a plurality of webs arranged to bear upon, and to be held in the grooves of said face of the base, the webs of one section lapping those of the other section.

12. In a removable hammer mold, a base comprising a plurality of separate spaced saddles, and rods connecting said saddles rigidly together whereby the saddles may be handled as a unit, and a plurality of cauls, each seated upon all of said saddles.

13. In a removable hammer mold, a base comprising a plurality of independent saddles united in parallel order, combined with a plurality of non-hinged cauls each having engagement with the individual saddles.

14. In a removable hammer mold, a base comprising a plurality of transverse parallel saddles, combined with non-hinged rocking cauls each provided with webs which have individual engagement with the saddles, each saddle being common to said cauls.

15. In a removable hammer mold, a base comprising a plurality of transverse parallel saddles, combined with non-hinged cauls each provided with webs which have sliding engagement with the individual saddles, said webs of the sections being disposed in lapping order.

16. In a removable hammer mold, a base comprising a plurality of transverse parallel saddles, each provided with a curved face, combined with rocking cauls provided with curved webs arranged to rest and slide in said saddles.

17. In a removable hammer mold, a base comprising a plurality of transverse parallel saddles, and means for staying the individual saddles against sidewise movement, combined with non-hinged swinging cauls supported by said saddles of the base.

18. In a removable hammer mold, a base comprising a plurality of transverse parallel saddles having longitudinal curved grooves, means connecting said saddles rigidly together, and stays for the separate saddles.

19. In a removable hammer mold, a base comprising a plurality of transverse parallel saddles, tie-rods fastened to said saddles and uniting them rigidly in parallel order, and means for reinforcing the individual saddles against spreading under pressure.

20. A removable hammer mold comprising a plurality of parallel connected saddles, each having a groove in its lower side and an arcuate upper side, and non-hinged cauls provided with webs resting within said arcuate faces of the saddles.

21. A removable hammer mold comprising a base having a longitudinal guideway in its lower side and an arcuate upper face, and non-hinged longitudinal cauls resting in said arcuate upper face to slide therein in an arcuate path.

22. A removable hammer mold comprising a base, complemental cauls supported by the base and provided with slotted upstanding arms, and fasteners passed through the slots in said arms for locking the arms together and holding the cauls in their closed positions.

23. A removable hammer mold comprising a carriage constructed at its lower side to coöperate with means for retaining said carriage in operative position within a press, said carriage being insertible or withdrawable by sliding it lengthwise within said press, cauls supported upon the carriage and removable at will therefrom, and means for locking the cauls in their closed operative positions, said locking means being free from engagement with the carriage.

24. A removable hammer mold comprising a base, and pairs of interchangeable non-pivoted cauls, each caul having means whereby said caul is seated removably on said base, said caul having working surfaces the curvatures of which differ from the curvatures of other cauls adapted for service in connection with said base.

25. A removable hammer mold comprising a base, and a pair of coöperating non-pivoted cauls fitted to said base and removable individually at will therefrom.

26. A removable hammer mold comprising a base, having means whereby it may be inserted or withdrawn endwise into or from a press, and non-pivoted cauls each supported on the base for sliding movement in an arcuate path thereon.

27. A removable hammer mold comprising a base, adapted for insertion into and withdrawal from a press, and non-hinged cauls supported removably on the base and adapted for opening and closing movement in arcuate paths thereon.

28. A removable hammer mold comprising a base adapted for insertion into and withdrawal from a press, and a pair of non-pivoted cauls fitted removably to said base and adapted to be lifted upwardly therefrom, said cauls being opened and closed by a sliding movement in an arcuate path.

29. A removable hammer mold comprising a base having a segmental upper face, and complemental cauls supported in said segmental face of the base, said cauls being free from hinged connection with each other and with the base, whereby the cauls may be lifted from the base and used interchangeably with other pairs of cauls.

30. A removable hammer mold comprising a base having an arcuate upper face, and non-pivoted cauls supported within said arcuate face, said cauls being removable individually and at will from the base.

31. A removable hammer mold comprising a base having a concave upper face, non-pivoted cauls supported in said face of the base, and coöperating devices between the base and the cauls for holding the latter against endwise movement in said base.

In testimony whereof I have signed my name to this specification in the presence of two subscribing witnesses.

EDMUND T. WOLF.

Witnesses:
JAS. H. GRIFFIN,
H. T. BERNHARD.